(12) United States Patent
Keser et al.

(10) Patent No.: US 10,574,810 B1
(45) Date of Patent: Feb. 25, 2020

(54) DISABLEMENT OF WI-FI ACCESS IN RESPONSE TO LACK OF ACTIVATED SIM CARD

(71) Applicant: AT&T Mobility II LLC, Atlanta, GA (US)

(72) Inventors: Katie Keser, Atlanta, GA (US); Tara Colon, Alpharetta, GA (US); Jeffrey Howard, Suwanee, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/372,718

(22) Filed: Apr. 2, 2019

(51) Int. Cl.
| | |
|---|---|
| *H04M 1/725* | (2006.01) |
| *H04W 48/02* | (2009.01) |
| *H04M 15/00* | (2006.01) |
| *H04W 88/02* | (2009.01) |
| *H04W 8/18* | (2009.01) |
| *H04W 12/06* | (2009.01) |

(52) U.S. Cl.
CPC ..... *H04M 1/72577* (2013.01); *H04M 15/715* (2013.01); *H04M 15/7556* (2013.01); *H04M 15/88* (2013.01); *H04W 8/18* (2013.01); *H04W 12/06* (2013.01); *H04W 48/02* (2013.01); *H04W 88/023* (2013.01)

(58) Field of Classification Search
CPC .......... H04M 1/72577; H04M 15/715; H04M 15/7556; H04M 15/88; H04W 12/06; H04W 48/02; H04W 88/023
See application file for complete search history.

(56) References Cited

U.S. PATENT DOCUMENTS

| | | | |
|---|---|---|---|
| 7,406,305 | B2 | 7/2008 | Laybourn et al. |
| 7,965,827 | B2 | 6/2011 | Myers et al. |
| 8,055,238 | B1 | 11/2011 | Gailloux et al. |
| 8,145,212 | B2 | 3/2012 | Lopresti et al. |
| 8,718,710 | B2 | 5/2014 | Billman |
| 8,909,225 | B2 | 12/2014 | Chang et al. |
| 9,143,886 | B1 | 9/2015 | Abou-El-Ella et al. |
| 9,277,395 | B2 | 3/2016 | Aboulhosn et al. |
| 9,392,457 | B2 | 7/2016 | Laden et al. |
| 9,883,374 | B2 | 1/2018 | Brooks et al. |
| 9,940,613 | B2 | 4/2018 | Salihi |
| 2009/0144151 | A1 | 6/2009 | Pajot |
| 2012/0071139 | A1* | 3/2012 | Kumar .................. H04W 4/50 455/414.1 |
| 2015/0296373 | A1 | 10/2015 | Morejon et al. |
| 2015/0350456 | A1* | 12/2015 | Chan ................... H04M 15/715 455/407 |
| 2018/0035365 | A1* | 2/2018 | Koratekere Honnappa ................ H04W 48/16 |
| 2019/0053044 | A1* | 2/2019 | Cho ....................... H04W 76/11 |

* cited by examiner

*Primary Examiner* — Marisol Figueroa
(74) *Attorney, Agent, or Firm* — Amin, Turocy & Watson, LLP

(57) ABSTRACT

Example embodiments relate to a user equipment that can receive a command to turn on the user equipment. In response to determining that the user equipment has not been initialized, and prior to displaying a graphical user interface listing a Wi-Fi network to which the user equipment can connect, the user equipment presents a graphical user interface that displays an option to activate a cellular service provided by a mobile network operator entity, but does not display an option to activate the cellular service at a subsequent time.

20 Claims, 11 Drawing Sheets

DISABLEMENT OF WI-FI ACCESS IN RESPONSE TO LACK OF ACTIVATED SIM CARD

TECHNICAL FIELD

The present application relates generally to the field of wireless communication and, more specifically, to the disablement of Wi-Fi access in response to a lack of an activated subscriber identity module (SIM) card in a user equipment.

BACKGROUND

Today, many user equipment (e.g., mobile phones, cellular communications-capable tablets) are marketed as "pay-as-you-go" devices and made available for sale at national retailers (e.g., Wal-Mart, Target, etc.). Typically, a user can buy a user equipment (UE) marketed this way at these national retailers, and an assistant at the store can assist with activating the SIM card that is to be inserted into the UEs. In contract to the user receiving a monthly bill and subscriber agreement, with a pay-as-you-go plan, a user would typically buy a "go card" credited with a pre-set quantity (e.g., $20, $25, $30, $40, etc.) that can be applied to the user's account and associated with the user's SIM card. Activating the card and loading the account with payment enables the user's UE, with the SIM card inserted, to use the cellular services of a mobile network operator (MNO) entity (e.g., AT&T, Verizon, Sprint-Nextel, Virgin, etc.) associated with the pay-as-you-go cellular service (e.g., make cellular calls from the phone, etc.). These UEs marketed as pay-as-you-go devices, while fully functional and very capable, are typically on sale for magnitudes less than premium-branded phones, and are heavily subsidized by MNOs. MNOs attempt to re-coup their subsidized costs through the user's purchase of go-cards to continue to use the mobile networks of the MNOs for mobile services.

However, many users are purchasing user equipment as a "grab and go," wherein the user purchases the phone without activating it in-store. The result is that many of these UEs are heavily subsidized by MNOs, but are never activated on the MNOs' mobile networks (e.g., purchasing and activating a SIM card, inserted into the user equipment), even though buying terms of conditions of the MNO might require several months (e.g., 6 months) of active service on the mobile network operator's network before use of the UE on another mobile network operator's network.

Some of the grab and go users are able to activate the Wi-Fi on the UE and use it as a smaller tablet. In other instances, once connected to a Wi-Fi network, a user can download over-the-top VoIP applications (e.g., Skype, Line, Google Voice, etc.) via the Wi-Fi connection, which allows the user to at least make calls over Wi-Fi. Additionally, gaining Wi-Fi also allows users that are bad actors to download applications that can be used to unlock the UEs (e.g., applications that can access the "unlock" code on a device, which allows the device to be used on another mobile network provider's network). MNOs typically lock their UEs, wherein the UE will only work with SIM cards from that MNO. This is especially the case where service providers sell the UEs at a discount in exchange for the user signing a long-term contract for service, or purchasing go-cards associated with pay-as-you-go service. Once unlocked, the user can sell these devices for substantial amounts of money to users that can choose other mobile network providers different from the one providing the subsidy on the device. As such, even though the original intent was for the user to be subscribed to, and use, the user equipment on the mobile network of the MNO that provided the subsidy, due to these scenarios, MNOs are unable to re-coup the subsidies they paid for the user equipment, and additionally, sale of unlocked user equipment can further undercut the sale and activation of user equipment at the retail level.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 11 illustrates another example of operations that can be performed by a UE that presents a graphical user interface usable to activate mobile service, prior to presenting an

DETAILED DESCRIPTION

Figure 1:
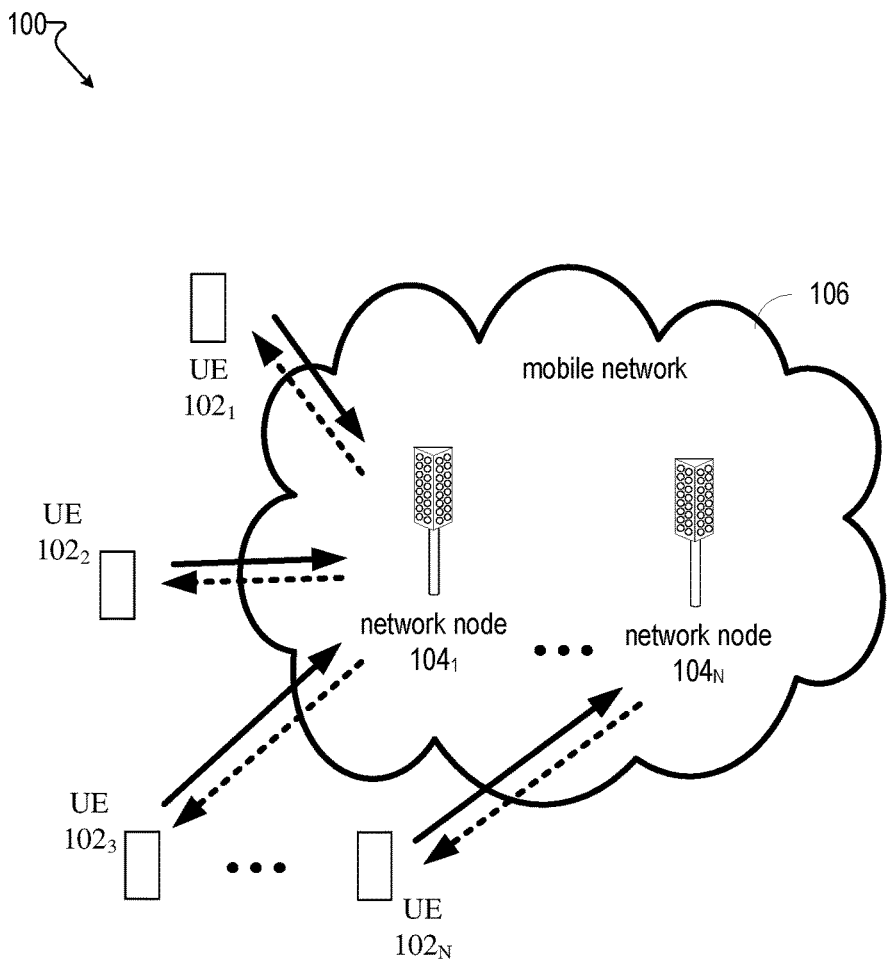
FIG. 1 illustrates an example wireless communication network in which a user equipment (UE) in accordance with various aspects and embodiments of the subject disclosure (also referred to as non-limiting embodiments) operates.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by a device (e.g., one or more devices) comprising programmable processors that execute machine executable instructions (e.g., computer program product, computer-readable instructions, software, software programs, software applications, software modules, etc.) to facilitate performance of the operations described herein. Examples of such a device, or devices, can comprise circuitry and components as described in FIG. 2.

As mentioned in the background, "grab and go" users are able to buy a heavily subsidized user equipment (UE) marketed as a pay-as-you-go device and, without activating a subscriber identity module (SIM) card (described further below with respect to FIG. 2) that can be used in the device, connect the UE to a Wi-Fi network. This allows the user of the UE to use it as a smaller tablet, download and use over-the-top VoIP applications (e.g. Skype, Line, Google Voice, etc.), or download applications that can be used to unlock the UE and sell it on the black market. Due to these scenarios, mobile network operator (MNO) entities are unable to re-coup the subsidies paid on the user equipment, and additionally, sale of unlocked user equipment can further undercut the sales and subscriptions associated with user equipment at the retail level.

In example embodiments, the present disclosure provides for a UE that is operable, in response to the absence of an activated SIM card in a SIM card slot interface, to disable access to Wi-Fi connection modules, and present the user with an indication on a graphical user interface (GUI) that access to Wi-Fi networks has been disabled.

FIG. 1 illustrates an example wireless communication system 100 (also referred to as wireless system, mobile system, mobile communications system) in which embodiments of the present disclosure can be implemented. In example embodiments (also referred to as non-limiting embodiments), wireless communication system 100 can comprise a mobile network 106 (mobile can also be referred to as cellular), which can comprise one or more mobile networks typically operated by communication service providers. The wireless communication system 100 can also comprise one or more user equipment (UE) $102_{1-N}$ (also referred to by example and in the singular as UE 102). UE $102_{1-N}$ can communicate with one another via one or more network nodes $104_{1-N}$ (referred to as network node 104 by example and in the singular) of the mobile network 106. The dashed arrow lines from the network nodes $104_{1-N}$ to the UE $102_{1-N}$ represent downlink (DL) communications and the solid arrow lines from the UE $102_{1-N}$ to the network nodes $104_{1-N}$ represent uplink (UL) communications.

UE 102 can comprise, for example, any type of device that can communicate with mobile network 106, as well as other networks (e.g., Wi-Fi network that serves as access to a fixed broadband communication system). Typical components of a UE are described further below with respect to FIG. 2. The UE 102 can have one or more antenna panels having vertical and horizontal elements. Examples of a UE 102 comprise a personal digital assistant (PDA), tablet, mobile terminal, smart phone, laptop mounted equipment (LME), a computer having mobile capabilities (e.g., such as a universal serial bus (USB) dongle enabled for mobile communications), a mobile device such as a cellular phone (e.g., mobile phone, mobile handset), a dual mode mobile handset, a laptop having laptop embedded equipment (LEE, such as a mobile broadband adapter), a tablet computer having a mobile broadband adapter, a wearable computing device such as a cellular-enabled watch, a virtual reality (VR) device, a heads-up display (HUD) device, a C-V2X client device associated with (e.g., integrated with, inside of, embedded in, mounted upon, etc.) a vehicle (e.g., motor vehicle, such as a car, van, bus, truck, etc.), and the like.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communication system 100 can be or can include a large-scale wireless communication network that spans various geographic areas, and can comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for LTE or 5G New Radio (NR) systems, the embodiments can be applicable to any radio access technology (RAT) or multi-RAT system where the UE operates using multiple carriers. For example, wireless communication system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier OFDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (Wi-Max), and the like.

Still referring to FIG. 1, in example embodiments, UE 102 can be communicatively coupled (or in other words, connected) to a network node 104 (e.g., network node 104 device) of the mobile network 106. Network node 104 can have a cabinet and other protected enclosure, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) controller devices. Network node 104 can also include multi-standard radio (MSR) radio node devices, including but not limited to: an MSR BS, an evolved NodeB device (eNodeB device, as referred to in LTE terminology), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is typically referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

Figure 2:
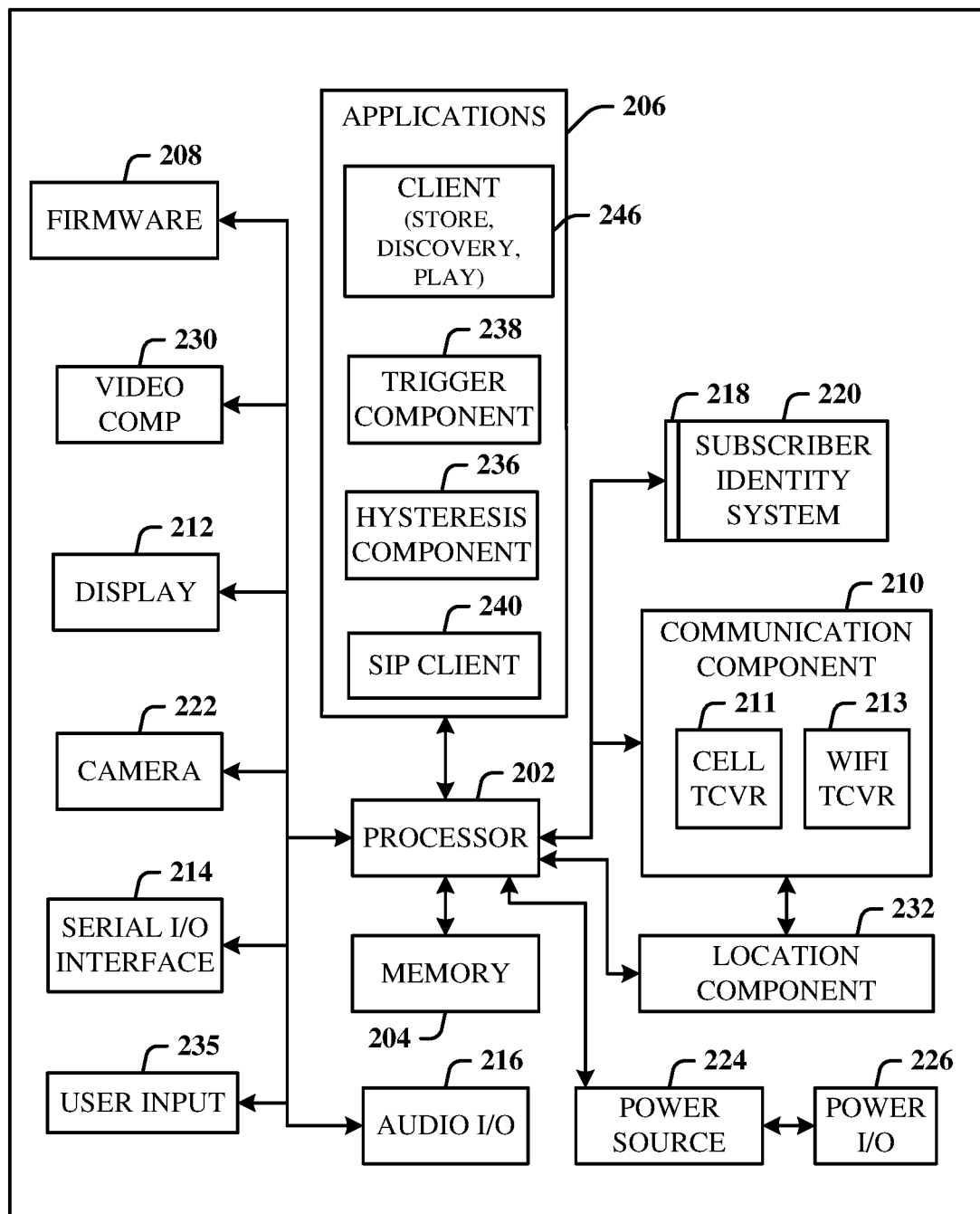
FIG. 2 illustrates a block diagram of example components in a user equipment that can execute processes and methods described herein, in accordance with various aspects and embodiments of the subject disclosure.

Referring now to FIG. 2, illustrated is a schematic block diagram illustrating some example components of an example user equipment (e.g., UE 102), which can be a mobile device, mobile phone, mobile tablet, etc., capable of connecting to a network (e.g., mobile network 106) in accordance with example embodiments described herein. One or more of the components as illustrated in FIG. 2 can comprise the user equipment, examples of which were described above with respect to FIG. 1. FIG. 2 illustrates an embodiment of a user equipment to provide context for the various embodiments described herein. The following discussion is intended to provide a brief, general description of an example of a suitable environment in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and that can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The UE 102 can comprise a processor 202 for controlling and processing all onboard operations and functions. A memory 204 interfaces to the processor 202 for storage of data and one or more applications 206 (e.g., a video player software, user feedback component software, etc.). Other applications can include voice recognition of predetermined voice commands that facilitate initiation of the user feedback signals. The applications 206 can be stored in the memory 204 and/or in a firmware 208, and executed by the processor 202 from either or both the memory 204 or/and the firmware 208. The firmware 208 can also store startup code for execution in initializing the UE 102. A communications component 210 interfaces to the processor 202 to facilitate wired/wireless communication with external systems, e.g., cellular networks, VoIP networks, and so on. Here, the communications component 210 can also include a suitable cellular transceiver 211 (e.g., a GSM transceiver) and/or an unlicensed transceiver 213 (e.g., Wi-Fi) for corresponding signal communications. Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station (e.g., a wireless access point, or WAP). Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices. The UE 102 can be a device such as a cellular telephone, a PDA with mobile communications capabilities, and messaging-centric devices. The communications component 210 also facilitates communications reception from terrestrial radio networks (e.g., broadcast), digital satellite radio networks, and Internet-based radio services networks.

The UE 102 comprises a display 212 for displaying text, images, video, telephony functions (e.g., a Caller ID function), setup functions, and for user input. For example, the display 212 can also be referred to as a "screen" that can accommodate the presentation of multimedia content (e.g., music metadata, messages, wallpaper, graphics, etc.). The display 212 can also display videos and can facilitate the generation, editing and sharing of video quotes. A serial I/O interface 214 is provided in communication with the processor 202 to facilitate wired and/or wireless serial communications (e.g., USB, and/or IEEE 1394) through a hardwire connection, and other serial input devices (e.g., a keyboard, keypad, and mouse). This supports updating and troubleshooting the UE 102, for example. Audio capabilities are provided with an audio I/O component 216, which can include a speaker for the output of audio signals related to, for example, indication that the user pressed the proper key or key combination to initiate the user feedback signal. The audio I/O component 216 also facilitates the input of audio signals through a microphone to record data and/or telephony voice data, and for inputting voice signals for telephone conversations.

The UE 102 can include a slot interface 218 for accommodating a SIC (Subscriber Identity Component) in the form factor of a Subscriber Identity Module (SIM) card 220, or universal SIM 220, and interfacing the SIM card 220 with the processor 202. However, while it is to be appreciated that the SIM card 220 can be manufactured into the UE 102 (e.g., embedded in the UE 102), and updated by downloading data and software, a typical UE marketed as a pay-as-you-go phone comprises a removable SIM card 220 (e.g., removable from the slot interface 218). A SIM card comprises a memory (e.g., memory chip) that can hold the personal information of the user account holder, including his or her phone number, address book, and other data. Since the user's phone number is tied to the SIM card, only the SIM card needs to be activated when the user opens an account with an MNO. Each SIM card has a unique number printed on its microchip, which the MNO can use to activate it. SIM cards are tied to a particular MNO and can only be used with a service plan from that MNO. Pre-paid SIM cards are also available for "pay-as-you-go" customers, allowing a phone that's locked to the pre-paid carrier's network, or an unlocked phone, to be used without a long-term subscriber contract. This type of card is desirable to users who do not want to be tied to one MNO, or who want to try out a particular MNO before committing to a long-term contract. Typically, a user would purchase the SIM card (or purchase a UE marketed as pay-as-you-go a go-phone, which typically includes a SIM card), and also purchase a go-card (e.g., associated with different plans or monetary amounts, such as a 45/month plan). The user would then activate the SIM card (e.g., using the UE), and then "refill" the card with the go-card. This process will be described further below with respect to FIG. 3 below. When a user wants to change UEs (e.g., from one mobile handset to another), the SIM card can be removed from the slot interface 218 and inserted into the slot interface of another UE. The user's phone number and personal information is carried on the SIM card, so typically there is little that needs to be done to the new UE to have it be enabled to communicate with the old SIM card on the new device.

Still referring to FIG. 2, the UE 102 can process IP data traffic through the communications component 210 to accommodate IP traffic from an IP network such as, for example, the Internet, a corporate intranet, a home network, a person area network, etc., through an ISP or broadband cable provider. Thus, VoIP traffic can be utilized by the UE 102 and IP-based multimedia content can be received in either an encoded or decoded format.

A video processing component 222 (e.g., a camera) can be provided for decoding encoded multimedia content. The video processing component 222 can aid in facilitating the generation, editing and sharing of video quotes. The UE 102 also comprises a power source 224 in the form of batteries and/or an AC power subsystem, which power source 224 can interface to an external power system or charging equipment (not shown) by a power I/O component 226.

The UE 102 can also include a video component 230 for processing video content received and, for recording and transmitting video content. For example, the video component 230 can facilitate the generation, editing and sharing of video quotes. A location tracking component 232 facilitates geographically locating the UE 102. As described hereinabove, this can occur when the user initiates the feedback signal automatically or manually. A user input component 234 facilitates the user initiating the quality feedback signal. The user input component 234 can also facilitate the generation, editing and sharing of video quotes. The user input component 234 can include such conventional input device technologies such as a keypad, keyboard, mouse, stylus pen, and/or touch screen, for example.

Referring again to the applications 206, a hysteresis component 236 facilitates the analysis and processing of hysteresis data, which is utilized to determine when to associate with the access point. A software trigger component 238 can be provided that facilitates triggering of the hysteresis component 236 when the Wi-Fi transceiver 213 detects the beacon of the access point. A SIP client 240 enables the UE 102 to support SIP protocols and register the subscriber with the SIP registrar server. The applications 206 can also include a client 242 that provides at least the capability of discovery, play and store of multimedia content, for example, music.

The UE 102, as indicated above related to the communications component 210, comprises an indoor network radio transceiver 213 (e.g., Wi-Fi transceiver). This function supports the indoor radio link, such as IEEE 802.11, for a dual-mode GSM handset. The UE 102 can accommodate at least satellite radio services through a handset that can combine wireless voice and digital radio chipsets into a single handheld device.

Figure 3:
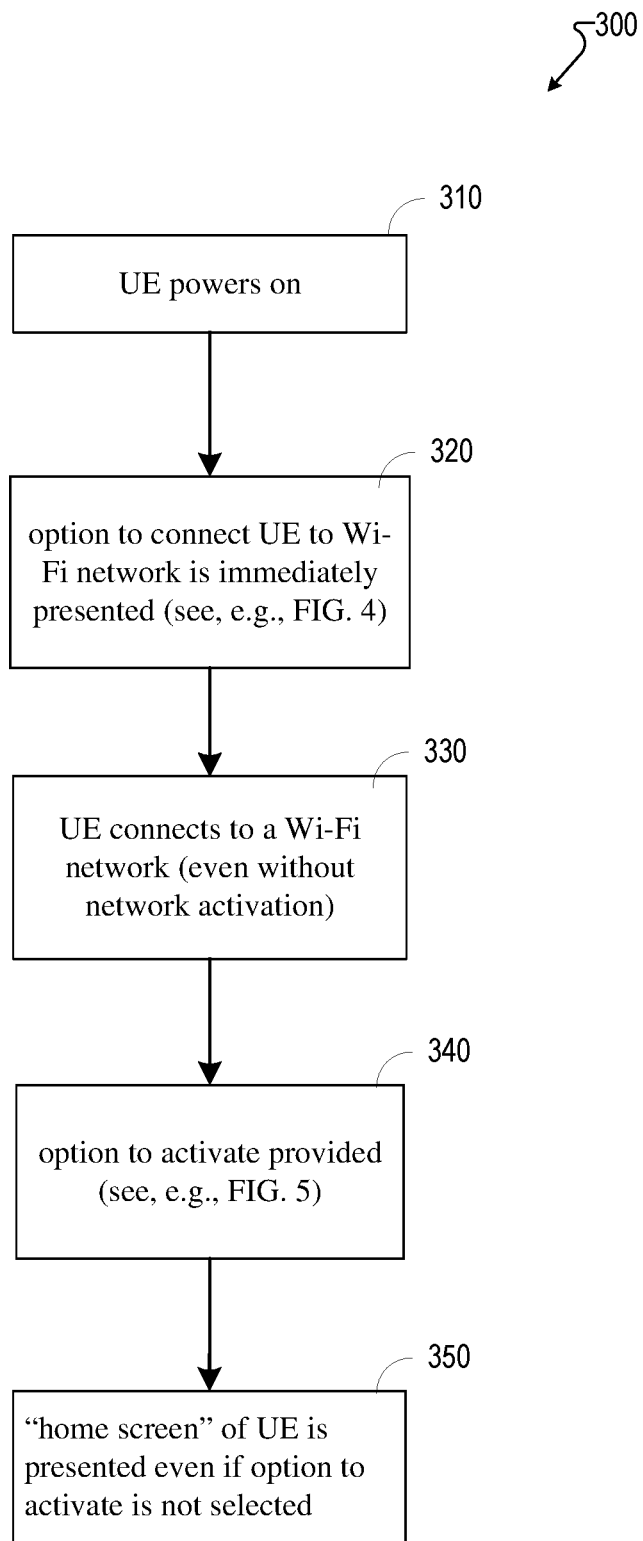
FIG. 3 illustrates a process performed by a typical user equipment, wherein the user equipment immediately presents a user with an option to connect to a Wi-Fi network, and further, presents a user with the option to activate mobile service later.

FIG. 3 shows a typical process 300 performed by a UE after the UE has been purchased and powered on. At block 310, the UE powers on (e.g., in response to a user turning on the device by pressing an on button).

At block 320, the UE immediately presented a GUI providing the user with an option to connect to a Wi-Fi network. An example interface for setting up a connection to a Wi-Fi network is described with respect to FIG. 4.

At block 330, if a user opts to connect the UE to a Wi-Fi network, the UE connects to a Wi-Fi network.

Figure 5:
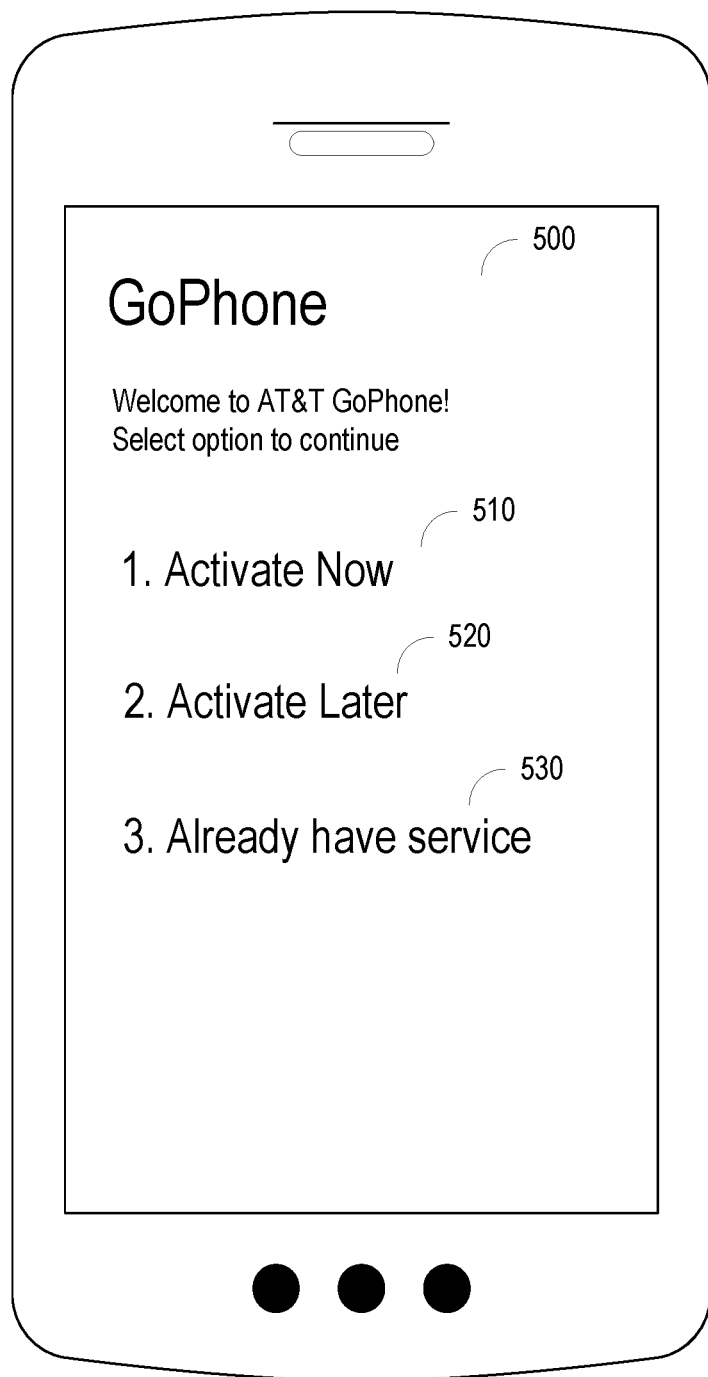
FIG. 5 illustrates an example graphical user interface displayed by a typical user equipment, which presents an option to activate mobile service later.

After presenting and connecting to a Wi-Fi network (in response to the user opting to connect the UE to a Wi-Fi network), at block 340, the UE presents a GUI that provides the user an option to activate the phone (e.g., activate a SIM card in the phone, if the SIM card has not yet been activated and has been inserted into the SIM card slot interface. An example of this GUI is shown in FIG. 5. If the user chooses not to activate the SIM card, then at step 350, the UE skips the activation step and presents the home screen of the UE to the user. As such, the UE, now connected to a Wi-Fi network, but without having an activated SIM card, can operate to download applications using the Wi-Fi network. As mentioned above, the UE can now serve as an internet-enabled mini-tablet, can download over-the-top VoIP applications such as Skype, and can also download software that can be used to unlock the phone. The phone can use the Wi-Fi connections indefinitely, even though a SIM card that can be used to connect the UE to the mobile network of the MNO that subsidized the phone was never activated.

Figure 4:
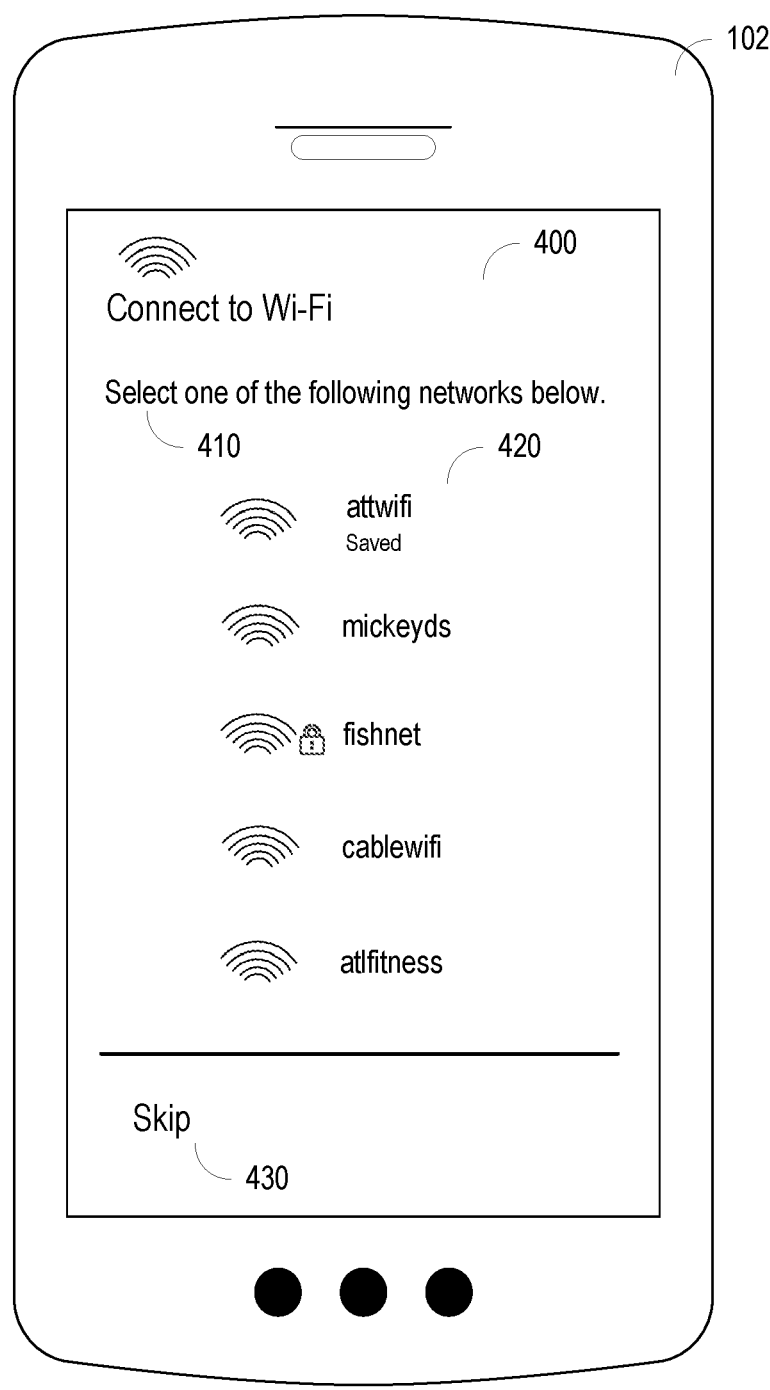
FIG. 4 illustrates an example of a graphical user interface displayed by a typical user equipment that is presented prior to service activation, and lists a Wi-Fi network to which a user equipment can connect.

FIG. 4 shows an example of a "connect to Wi-Fi" graphical user interface (GUI) that can be displayed by a typical UE. The connect to Wi-Fi GUI 400 can display a prompt to a user to select a Wi-Fi network for the UE to connect (e.g., Wi-Fi selection prompt 410), along with a displayed list of Wi-Fi networks (Wi-Fi networks list 420). The UE can also present the user with an option to skip connection to a Wi-Fi network (e.g., skip button 430). Regardless of whether the user has selected a Wi-Fi network to which to connect, the typical UE presents an activation GUI, as shown in FIG. 5.

Referring now to FIG. 5, the activation GUI 500 presented by the typical UE comprises an "activate now" option 510, an "activate later" option 520, an "already have service" option 530. In response to a user selecting the activate now option 510, the UE can present instructions to obtain inputted information from the user identity to activate the SIM card in the slot interface. The typical activation process involves dialing in a sequence of numbers representing an activation code for the SIM card and the pay-as-you-go plan (e.g., $45 a month plan). The pin number of the refill go-card can also be entered each time the user wants to re-fill the account associated with the SIM card with more funds. If the user selects the activate later option 520, then the device, as mentioned above in FIG. 3, proceeds to the home screen.

Thus, in typical UEs, a user is presented with the option to connect to a Wi-Fi network, before being presented with the option to activate the service for the UE. Further, a user can opt not to activate the mobile service. The result is that the phone can be connected to a Wi-Fi network, and can be operated using the Wi-Fi connection without ever having an activated SIM card in its slot interface.

The present application provides for example embodiments of a UE that is operable, in response to the absence of an activated SIM card in a SIM card slot interface, to disable access to Wi-Fi connection modules, and present the user with an indication on a graphical user interface (GUI) that access to Wi-Fi networks has been disabled.

In example embodiments, UE 102 comprising a processor and a memory that stores executable instructions that, when executed by the processor, facilitate performance of operations, including those operations/methods described below. In each of these operations, steps or aspects described in one operation can be substituted or combined with steps and aspects with respect to the other operations, as well as features described, unless context warrants that such combinations or substitutions are not possible. Further, if a feature, step, or aspect is not described with respect to example operations, this does not mean that said feature, step, or aspect is incompatible or impossible with respect to those operations. As such the example operations of the present application described above and below are not necessarily limited to the steps, features, or aspects that are described with respect to those example operations.

Figure 6:
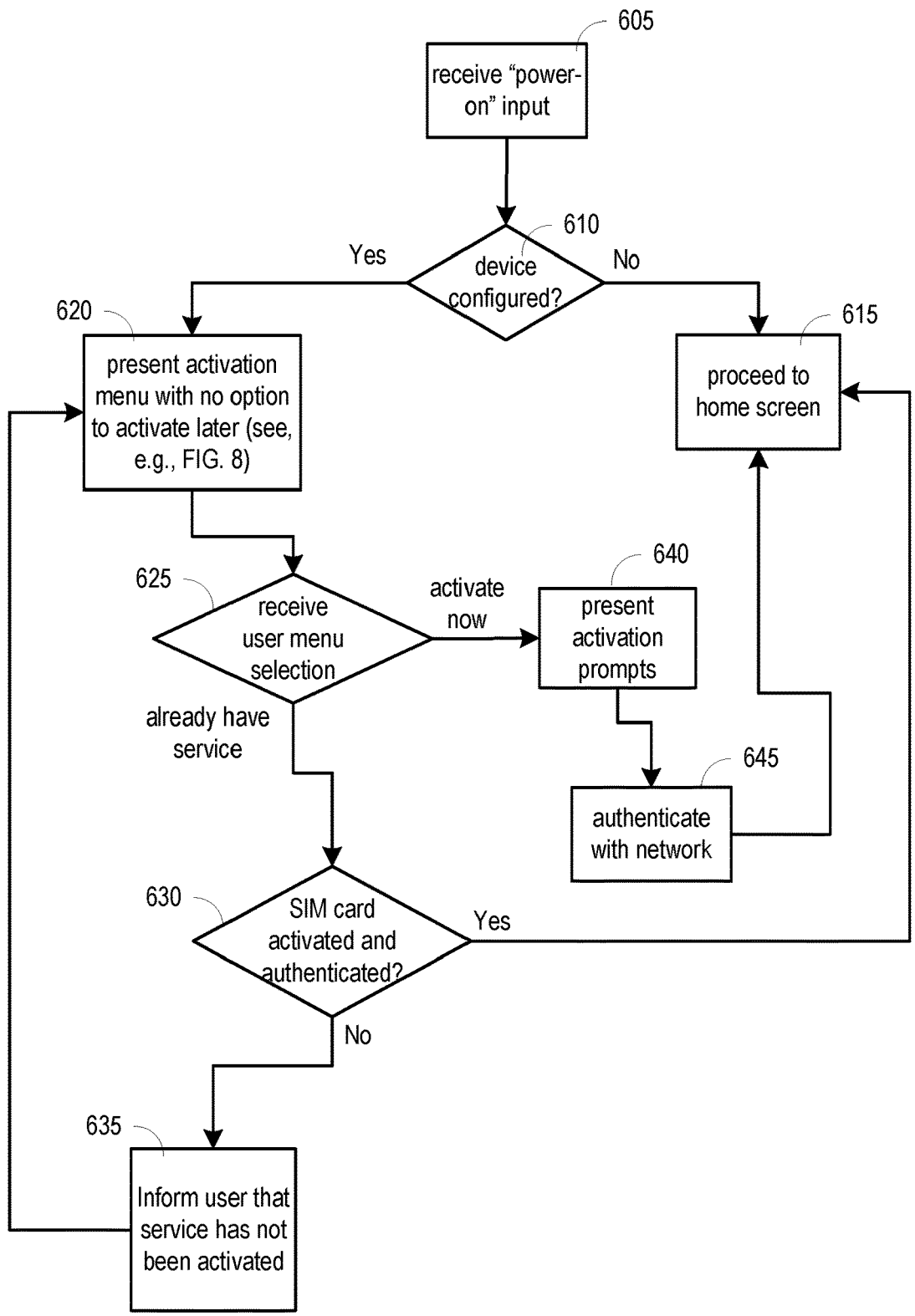
FIG. 6 illustrates example operations that can be performed by a UE that presents a graphical user interface usable to activate mobile service, prior to presenting an option to connect to a Wi-Fi network, in accordance with various aspects and embodiments of the subject disclosure.

FIG. 6 illustrates a flow diagram of example operations 600, in accordance with the present disclosure, that can be performed, for example, by UE 102 comprising a processor and a memory that stores executable instructions that, when executed by the processor, facilitate performance of the example operations 600. At block 605 of the example operations 600, the UE 102 receives a command to power on the device. The command can be input by a user identity by, for example, pushing the "on" button of the UE 102.

At block 610, the UE 102 determines if the UE 102 has completed an initialization process, e.g., whether it has been configured for use. Typically, this initialization process comprises an initial setup of the UE 102, for example, activating a SIM card, transferring information from one device to another, establishing user accounts (e.g., Apple ID, iTunes account, Google account, Microsoft account, Yahoo account), setting up voicemail, display settings, language settings, and other settings, etc. If this is the first time that the UE has been powered on, the UE 102 has not been configured yet. As such, in response to a determination that the device has not been configured, the UE 102 will initiate an activation routine. Otherwise, if the UE has completed an initialization process, the UE 102 will display the home screen at block 615.

At block 620, the activation routine of the example operations can comprise presenting an activation GUI (e.g., FIG. 7) that does not present an option to activate the service later. The options presented to the user in a menu can comprise activating now, or an option to indicate that the user already has mobile service associated with the MNO.

At 625, the UE 102 can receive a user's menu selection. The user can enter the selection, for example, by touching (or using a stylus) the selection on a UE's touchscreen.

In response to the user selecting the menu item indicating that the user already has service, at 630 the UE 102 can determine whether the SIM card that is in the device (if the SIM card is present in the slot interface) has been activated. In response to the SIM card having been activated, the UE 102 will then engage in trying to send signals to the mobile network. The UE 102 can send a transmission initiating authentication of the UE 102 with a network device such as a radio access network controller (RAN controller), which can be a management mobility entity (MME) device in the case of LTE, or in the case of a 5G network, an Access and Mobility Management function (AMF) device. Note that other components of the network can also be involved in the authentication (e.g., Unified Data Management (UDM) function server, or a Home Subscriber Server (HSS)). In example embodiments, the MME or AWF can send an authentication request to the UE 102. The UE 102, in response to receiving the authentication request, can send an authentication response to the MME or AWF. In response to the UE 102 being activated and authenticated, the UE 102 can, at block 615, proceed to the home screen (e.g., display the home screen GUI on the UE 102).

In response to the SIM card not being activated, then the UE 102 can at block 635 display on the GUI an indication to the user that service has not been activated. The UE 102 can then present the activation menu again (e.g., block 620).

At block 620, in response to receiving a user input indicating that the user wants to activate the service now, the UE 102 can at block 640 present activation prompts to obtain user input related to activating the SIM card and filling/refilling the SIM card with funds. After authentication with the mobile network 106, the UE can then present the home screen GUI.

After the SIM card has been activated and authentication has been completed, the user can, from the home screen GUI, select the controls that relate to connecting to the Wi-FI network. Alternatively, upon activation of the service, the UE 102 can present a Wi-Fi connection menu (e.g., as shown in FIG. 4).

Thus, as opposed to a typical UE described above in FIGS. 3-5, the example UE 102 of the present disclosure does not present a GUI with an option to connect to a Wi-Fi network, and further, presents a GUI in which it is not an option to activate the service later. Requiring a user to buy a SIM card and fill it with at least the minimum amount of funds required to obtain service can significantly deter a user from buying the cellphone only with the intent to connect to the Wi-Fi but not activate the service. For the bad actors that have the intent of connecting to the WI-Fi only, and then using the Wi-Fi network to download software to unlock the phone so that it can be sold, requiring activation provides an added cost to their operation and thus a disincentive to engage in behavior resulting in the sale of the device on the black market.

Of further note, in example embodiments, during the example operations 600 (e.g., after powering on, or after receiving menu selections by the user, etc.) the UE 102 can determine whether a SIM card (e.g., SIM card 220) has been inserted into the slot interface (e.g., slot interface 218). In response to a determination that a SIM card has not been inserted into the slot interface, the UE 102 can prompt the user to insert a SIM card into the slot interface of the UE 102.

Figure 7:
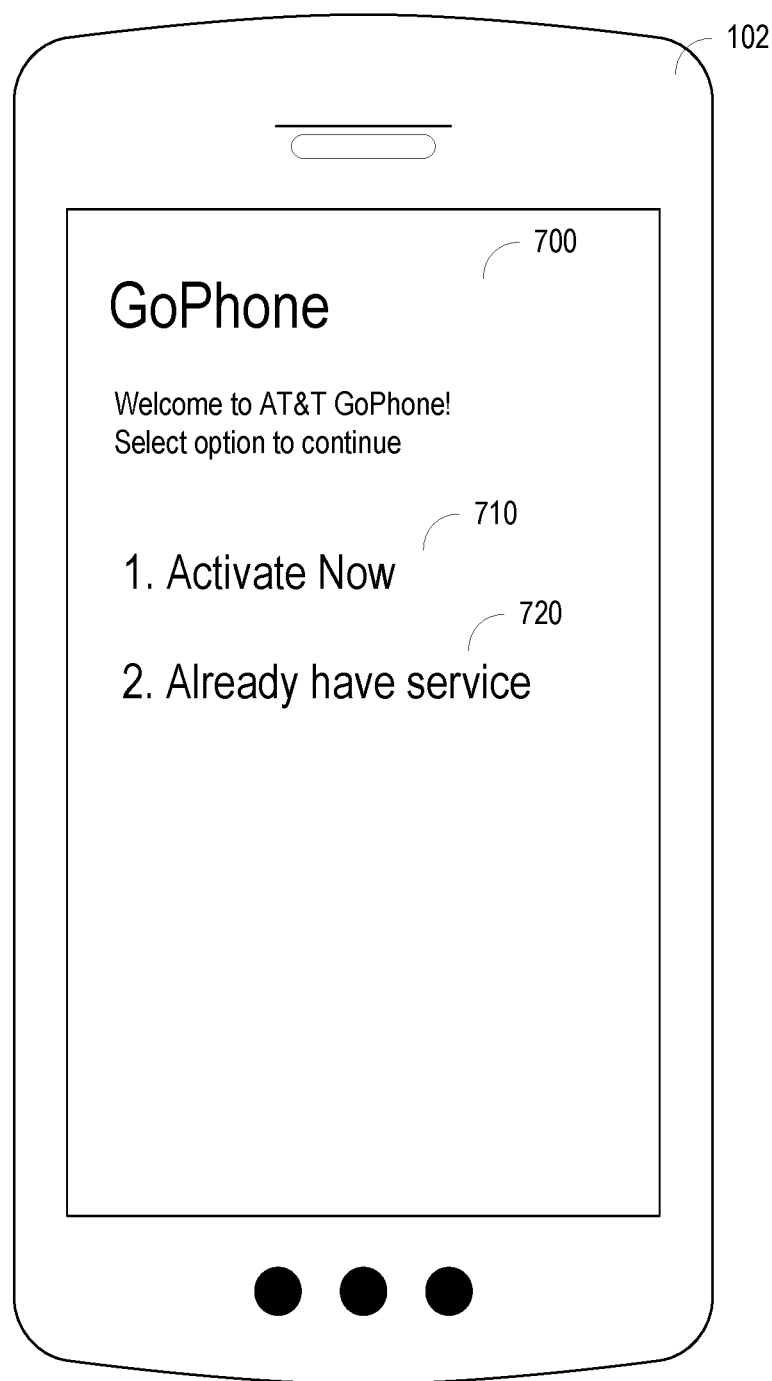
FIG. 7 illustrates an example graphical user interface displayed by a UE that does not present an option to activate mobile service at a later time, in accordance with various aspects and embodiments of the subject disclosure.

FIG. 7 illustrates an activate now GUI 700 that can be presented to the user by UE 102, wherein the GUI does not display any option to activate the service later. As mentioned above with respect to the operations 600 and FIG. 6, the activate now GUI 700 can be presented upon power-up of an unconfigured UE 102 (e.g., new out of the box, or after the UE 102 had been reset), prior to the presentation of any interface that allows a user to connect the UE to a Wi-Fi access point, or Wi-Fi network. In the example embodiment shown in FIG. 7, the activate now GUI 700 contains an "activate now" menu item 710, and an "already have service" menu item 720. It does not contain, present, or display, however, any menu item that indicates that the user can skip activation, or that the user can activate the service later.

Figure 8:
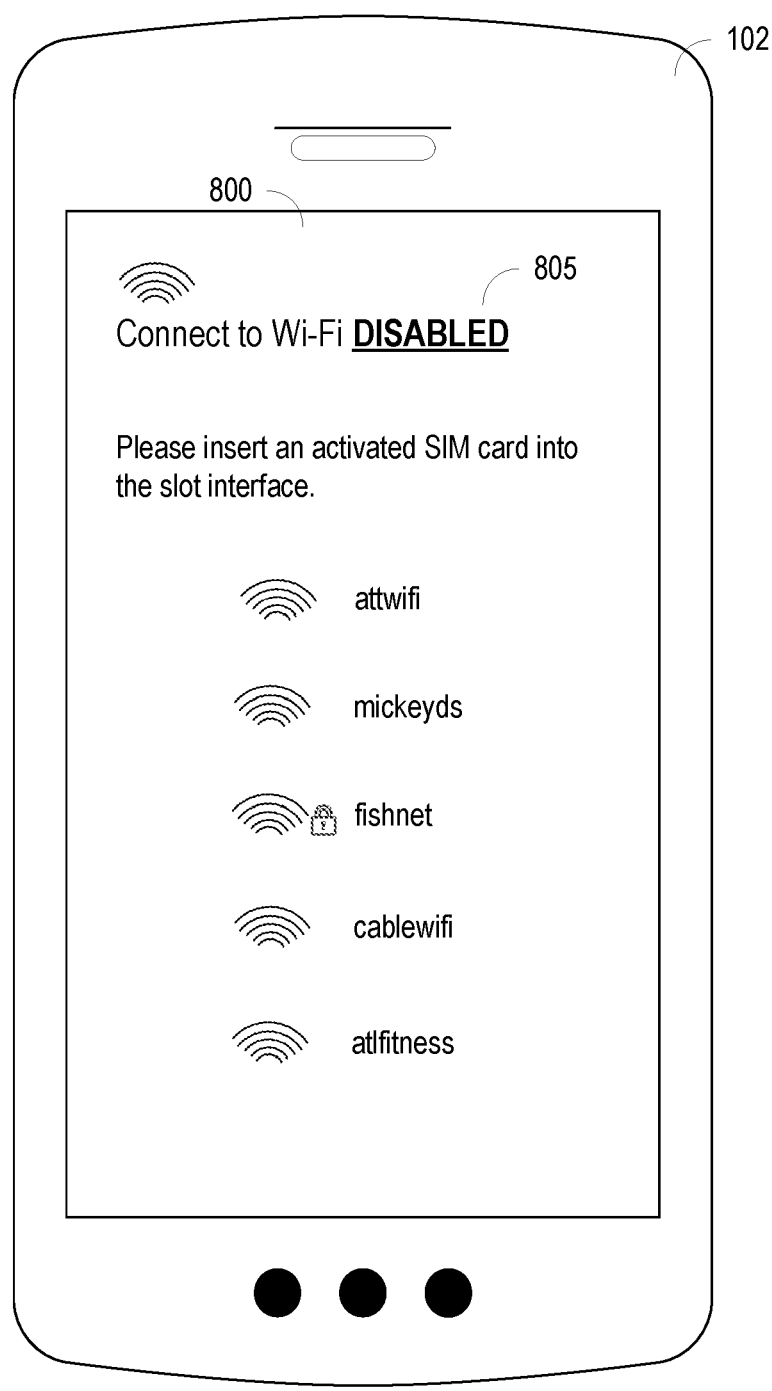
FIG. 8 illustrates an example graphical user interface displayed by a UE that depicts the disablement, or inaccessibility, of Wi-Fi connection access, in accordance with various aspects and embodiments of the subject disclosure.

Referring now to FIG. 8, in example embodiments, Wi-Fi connections can also be disabled unless the service has been activated (e.g., until the UE detects that an activated SIM card is in the slot interface of the UE 102). Additionally, any interface that is presented to the user in which a user can interact to connect to a Wi-Fi network, can show the connection options as "grayed out" or disabled (e.g., as shown in GUI 800, there is a disabled indicator 805, which can inform a user that the connection to Wi-Fi has been disabled). The UE 102 can, as shown in FIG. 8, inform the user that a working (e.g., activated) SIM card must be inserted into the slot interface (e.g., present GUI with text that informs the user that Wi-Fi has been disabled when there is no working SIM card in the slot interface).

Figure 9:
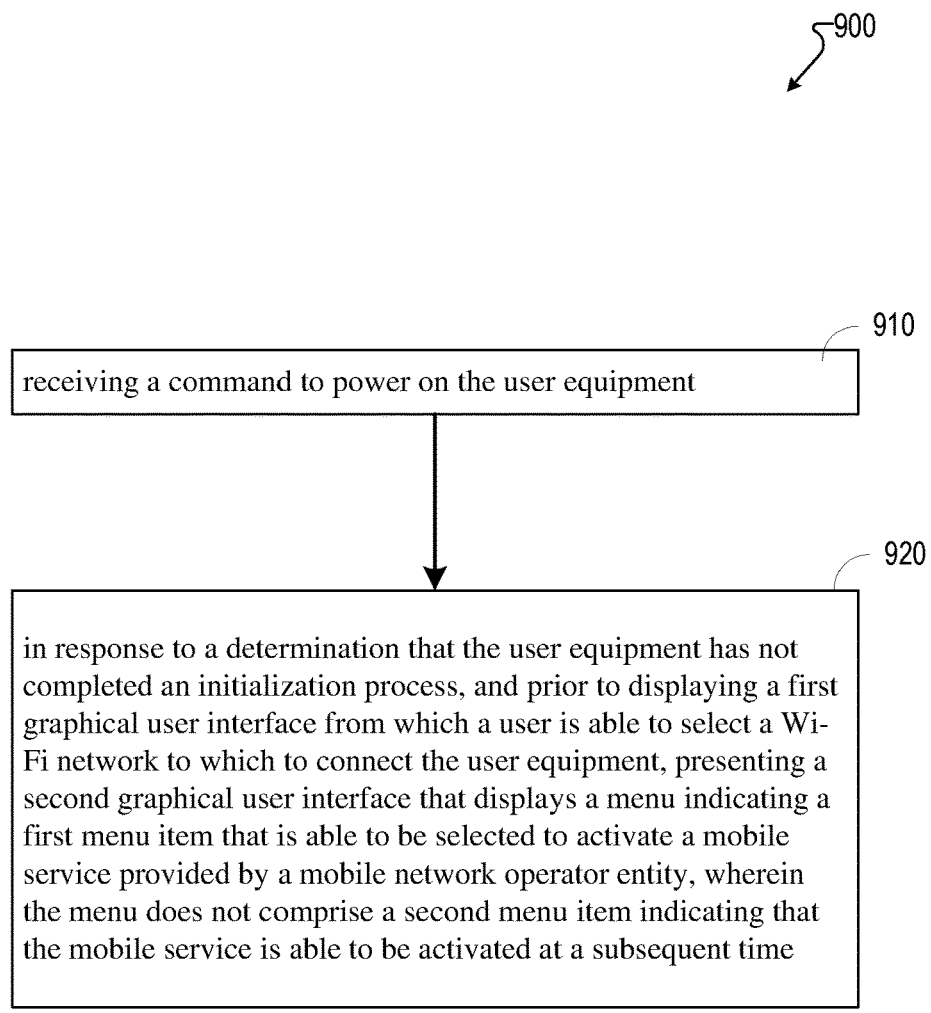
FIG. 9 illustrates another example of operations that can be performed by a UE that presents a graphical user interface usable to activate mobile service, prior to presenting an option to connect to a Wi-Fi network, in accordance with various aspects and embodiments of the subject disclosure.

FIG. 9 illustrates a flow diagram of example of operations 900 that can be performed, for example, by a user equipment (e.g., UE 102) comprising a processor and a machine-readable storage medium (e.g., memory) that stores executable instructions that, when executed by the processor, facilitate performance of the operations described in FIG. 9.

The example operations 900 can, at block 910, comprise receiving a command to power on the user equipment (e.g., a mobile device such as a cellular phone, or tablet, or other devices as indicated above).

The example operations 900 at block 920 can comprise, in response to a determination that the user equipment has not completed an initialization process, and prior to displaying a first graphical user interface (e.g., connect to Wi-Fi GUI 400) from which a user is able to select a Wi-Fi network to which to connect the user equipment, presenting a second graphical user interface (e.g., activate now GUI 700) that displays a menu indicating a first menu item (e.g., "activate now" menu item 710) that is able to be selected to activate a mobile service provided by a mobile network operator entity, wherein the menu does not comprise a second menu item (e.g., an activate later option 520) indicating that the mobile service is able to be activated at a subsequent time. In example embodiments, the first graphical user interface can display a list comprising a selectable entry corresponding to the Wi-Fi network to which the user equipment is able to connect (e.g., Wi-Fi networks list 420).

The example operations 900 can further comprise, in response to an input corresponding to the first menu item, presenting prompts that request information usable to activate a subscriber identity module card inserted into the user equipment. The example operations 900 can further comprise receiving from a network device (e.g., network node 104) an authentication request to authenticate transmissions to a mobile network. The example operations 900 can further comprise, in response to the authentication request, transmitting an authentication response. The authentication request can be transmitted via the network device by a management mobility entity (MME) device. The authentication request can be transmitted via the network device by an access and mobility management function (AMF) device.

Figure 10:
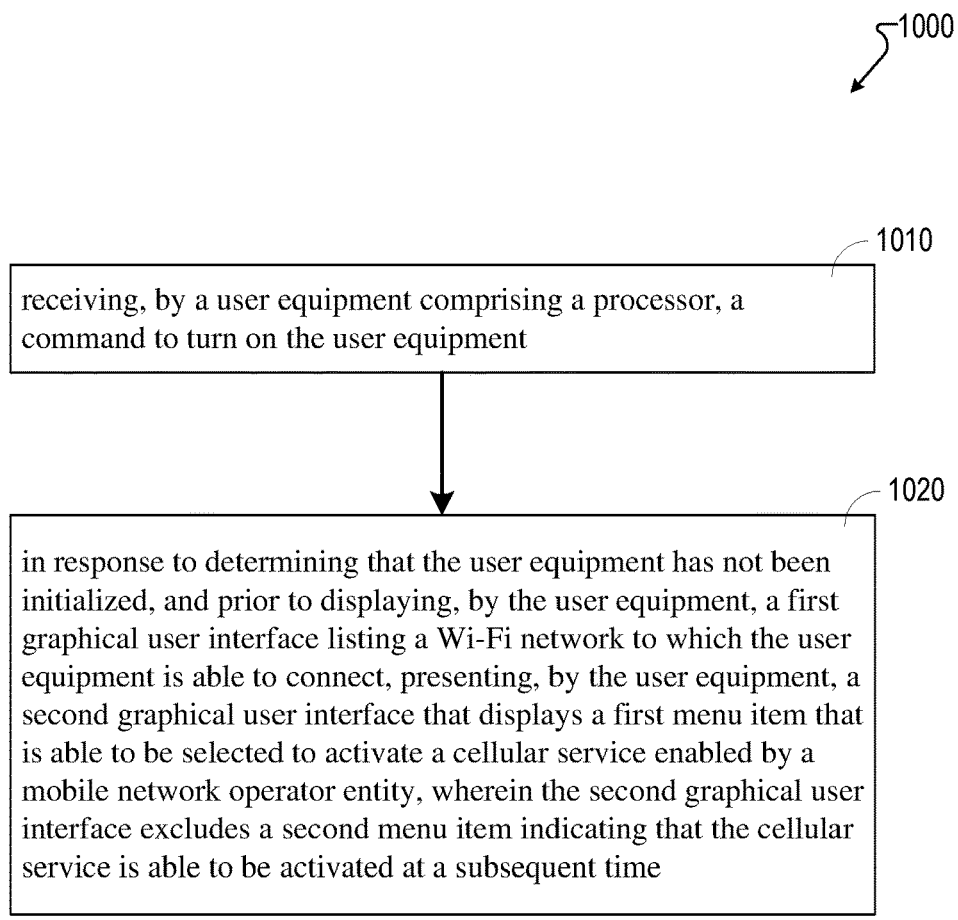
FIG. 10 illustrates another example of operations that can be performed by a UE that presents a graphical user interface usable to activate mobile service, prior to presenting an option to connect to a Wi-Fi network, in accordance with various aspects and embodiments of the subject disclosure.

FIG. 10 illustrates a flow diagram of example of operations 1000 that can be performed, for example, by a user equipment (e.g., UE 102) comprising a processor and a machine-readable storage medium (e.g., memory) that stores executable instructions that, when executed by the processor, facilitate performance of the operations described in FIG. 10.

The example operations 1000 can, at block 1010, comprise, receiving, by a user equipment comprising a processor, a command to turn on the user equipment (e.g., a mobile device such as a cellular phone, or tablet, or other devices as indicated above).

The example operations 1000 at block 1020 can comprise, in response to determining that the user equipment has not been initialized, and prior to displaying, by the user equipment, a first graphical user interface (connect to Wi-Fi GUI 400) listing a Wi-Fi network to which the user equipment is able to connect, presenting, by the user equipment, a second graphical user interface that displays a first menu item that is able to be selected to activate a cellular service enabled by a mobile network operator entity, wherein the second graphical user interface excludes a second menu item indicating that the cellular service is able to be activated at a subsequent time. The first graphical user interface can display a list comprising a selectable entry corresponding to the Wi-Fi network to which the user equipment is able to connect (e.g., Wi-Fi networks list 420).

The example operations 1000 can further comprise presenting, by the user equipment, prompts that request information usable to activate a subscriber identity module card inserted into the user equipment. The example operations 1000 can further comprise receiving, by the user equipment, an authentication request from a network device (e.g., network node 104) to authenticate transmissions to a mobile network. The example operations 1000 can further comprise, in response to the authentication request, transmitting, by the user equipment, an authentication response. The authentication request can be transmitted via the network device by a management mobility entity (MME) device. The authentication request can be transmitted via the network device by an access and mobility management function (AMF) device.

Figure 11:
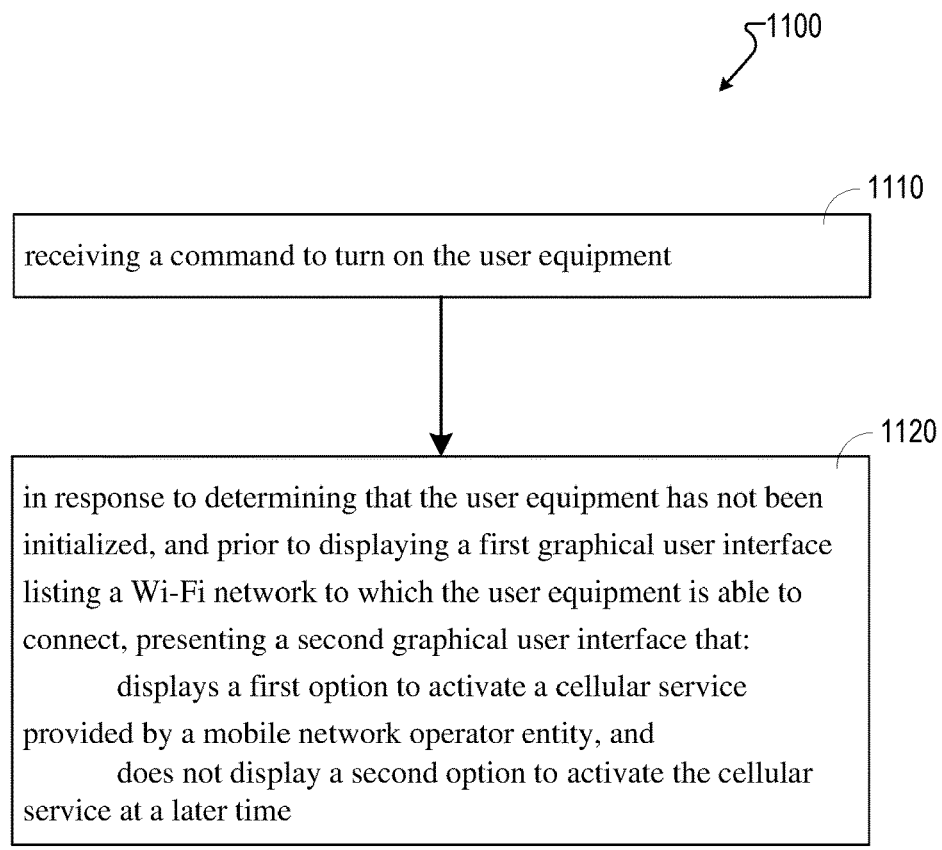

FIG. 11 illustrates a flow diagram of example of operations 1100 that can be performed, for example, by a user equipment (e.g., UE 102) comprising a processor and a machine-readable storage medium (e.g., memory) that stores executable instructions that, when executed by the processor, facilitate performance of the operations described in FIG. 11.

The example operations 1100 can, at block 1110, comprise receiving a command to turn on the user equipment (e.g., a mobile device such as a cellular phone, or tablet, or other devices as indicated above).

The example operations 1100 can, at block 1120, comprise, in response to determining that the user equipment has not been initialized, and prior to displaying a first graphical user interface (e.g., connect to Wi-Fi GUI 400) listing a Wi-Fi network to which the user equipment is able to connect, presenting a second graphical user interface (activate now GUI 700). The second graphical user interface displays a first option (e.g., "activate now" menu item 710) to activate a cellular service provided by a mobile network operator entity, and does not displays a second option (e.g., an activate later option 520) to activate the cellular service at a later time. The second graphical user interface displays a third option to indicate that the cellular service has already been activated (e.g., "already have service" menu item 720).

The example operations 1100 can further comprise, in response to an input corresponding to the first option, requesting information usable to activate a subscriber identity module card inserted into a slot interface of the user equipment. The example operations 1100 can further comprise, receiving from a network device (e.g., network node 104) an authentication request to authenticate transmissions to a mobile network. The example operations 1100 can further comprise, in response to the authentication request, transmitting an authentication response. The authentication request can be transmitted via the network device by a management mobility entity (MME) device. The authentication request can be transmitted via the network device by an access and mobility management function (AMF) device.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several example embodiments, such feature can be combined with one or more other features of the other example embodiments as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods/operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Therefore, the disclosed subject matter should not be limited to any single embodiment described herein, but rather should be construed in breadth and scope in accordance with the claims below.

What is claimed is:

1. A user equipment, comprising:
a processor; and
a memory that stores executable instructions that, when executed by the processor, facilitate performance of operations, comprising:
receiving a command to power on the user equipment, wherein the user equipment is operable to:
begin an initialization process to activate a subscriber identity module card in the user equipment prior to presentment of an option to connect to a Wi-Fi network, and
connect to the Wi-Fi network after the user equipment has completed the initialization process; and
in response to a determination that the user equipment has not completed the initialization process, and prior to displaying a first graphical user interface from which a user is able to select the Wi-Fi network to which to connect the user equipment, presenting a second graphical user interface that displays a menu indicating a first menu item that is able to be selected to activate a mobile service provided by a mobile network operator entity, wherein the menu does not comprise a second menu item indicating that the mobile service is able to be activated at a subsequent time, resulting in facilitation of prevention of a download, via the Wi-Fi network, of a software application that is able to be used to unlock the user equipment.

2. The user equipment of claim 1, wherein the user equipment comprises a mobile device.

3. The user equipment of claim 2, wherein the mobile device comprises a cellular phone.

4. The user equipment of claim 2, wherein the mobile device comprises a tablet device.

5. The user equipment of claim 1, wherein the first graphical user interface displays a list comprising a selectable entry corresponding to the Wi-Fi network to which the user equipment is able to connect.

6. The user equipment of claim 1, wherein the operations further comprise:
in response to an input corresponding to the first menu item, presenting prompts that request information usable to activate a subscriber identity module card inserted into the user equipment.

7. The user equipment of claim 6, wherein the operations further comprise:
receiving from a network device an authentication request to authenticate transmissions to a mobile network.

8. The user equipment of claim 7, wherein the operations further comprise:
in response to the authentication request, transmitting an authentication response.

9. The user equipment of claim 8, wherein the authentication request was transmitted via the network device by a management mobility entity device.

10. The user equipment of claim 8, wherein the authentication request was transmitted via the network device by an access and mobility management function device.

11. A method, comprising:
receiving, by a user equipment comprising a processor, a command to turn on the user equipment, wherein the user equipment is operable to:
in response to receiving the command, beginning, by the user equipment, an initialization process to activate a subscriber identity module card in the user equipment prior to presentment of an option to connect to a Wi-Fi network, and
connecting, by the user equipment, to the Wi-Fi network after the user equipment has completed the initialization process; and
in response to determining that the user equipment has not been initialized according to the initialization process, and prior to displaying, by the user equipment, a first graphical user interface listing the Wi-Fi network to which the user equipment is able to connect, presenting, by the user equipment, a second graphical user interface that displays a first menu item that is able to be selected to activate a cellular service enabled by a mobile network operator entity, wherein the second graphical user interface excludes a second menu item indicating that the cellular service is able to be activated at a subsequent time, resulting in facilitation of prevention of a download, via the Wi-Fi network, of a software application that can be used to unlock the user equipment.

12. The method of claim 11, wherein the first graphical user interface displays a list comprising a selectable entry corresponding to the Wi-Fi network to which the user equipment is able to connect.

13. The method of claim 11, further comprising:
presenting, by the user equipment, prompts that request information usable to activate a subscriber identity module card inserted into the user equipment.

14. The method of claim 13, further comprising:
receiving, by the user equipment, an authentication request from a network device to authenticate transmissions to a mobile network.

15. The method of claim 14, further comprising:
in response to the authentication request, transmitting, by the user equipment, an authentication response.

16. A non-transitory machine-readable storage medium, comprising executable instructions that, when executed by a processor of a user equipment, facilitate performance of operations, comprising:
after receiving a command to turn on the user equipment,
attempting an initialization process to activate a subscriber identity module card in the user equipment prior to presentment of an option to connect to a Wi-Fi network, and
connecting to the Wi-Fi network after the user equipment has completed initialization according to the initialization process; and
in response to determining that the user equipment has not been initialized according to the initialization process, and prior to displaying a first graphical user interface listing a Wi-Fi network to which the user equipment is able to connect, presenting a second graphical user interface that:
displays a first option to activate a cellular service provided by a mobile network operator entity, and
does not displays a second option to activate the cellular service at a later time, resulting in facilitation of prevention of a download via the Wi-Fi network, of a software application that can be used to unlock the user equipment.

17. The non-transitory machine-readable storage medium of claim 16, wherein the second graphical user interface displays a third option to indicate that the cellular service has already been activated.

18. The non-transitory machine-readable storage medium of claim 16, wherein the operations further comprise:
in response to an input corresponding to the first option, requesting information usable to activate a subscriber identity module card inserted into a slot interface of the user equipment.

19. The non-transitory machine-readable storage medium of claim 18, wherein the operations further comprise:
receiving from a network device an authentication request to authenticate transmissions to a mobile network.

20. The non-transitory machine-readable storage medium of claim 19, wherein the operations further comprise:
in response to the authentication request, transmitting an authentication response.

* * * * *